United States Patent [19]

Colby

[11] Patent Number: 4,752,136
[45] Date of Patent: Jun. 21, 1988

[54] EXTRUDER INJECTION APPARATUS AND METHOD

[75] Inventor: Paul N. Colby, Lawrence County, Pa.

[73] Assignee: Spirex Corporation, Youngstown, Ohio

[21] Appl. No.: 889,094

[22] Filed: Jul. 23, 1986

[51] Int. Cl.⁴ .............................................. B29B 1/06
[52] U.S. Cl. ...................................... 366/89; 366/323
[58] Field of Search .................. 366/76, 79, 88, 89, 366/90, 99, 323; 425/208

[56] References Cited

U.S. PATENT DOCUMENTS

| | | |
|---|---|---|
| 3,698,541 | 10/1972 | Barr . |
| 3,867,079 | 2/1975 | Kim .................................... 366/88 |
| 3,870,284 | 3/1975 | Kruder . |
| 3,989,941 | 11/1976 | Gasior et al. . |
| 4,015,832 | 4/1977 | Kruder . |
| 4,128,341 | 12/1978 | Hsu . |
| 4,173,417 | 11/1979 | Kruder . |
| 4,197,070 | 4/1980 | Koschmann ........................ 366/79 |
| 4,201,481 | 5/1980 | Iddon et al. ........................ 366/79 |
| 4,215,978 | 8/1980 | Takayama et al. .................. 366/89 |
| 4,277,182 | 7/1981 | Kruder . |
| 4,405,239 | 9/1983 | Chung et al. ........................ 366/89 |

Primary Examiner—Timothy F. Simone
Assistant Examiner—Corinne M. Reinckens
Attorney, Agent, or Firm—Alvin E. Ring

[57] ABSTRACT

A plasticating apparatus including a rotating screw having a helical flight disposed within and cooperating with the inner wall of a heated barrel. Resinous material is introduced to a helical valley extending along said flight to be plasticated by said screw and advanced towards an outlet opening. The screw has a metering section for working said resinous material at high temperature. The bottom surface of the helical valley in said metering section is divided into side by side relatively shallow and relatively deep levels having a depth differential therebetween. The relatively shallow and relatively deep levels extend along the bottom surface of the helical valley in side by side helical paths. The side by side helical paths have a different pitch than the pitch of the helical flight so that the helical flight periodically interrupts the helical paths. The depth of the shallow level remains substantially uniform in the metering section and the depth of the deep level also remains substantially uniform in the metering section. The depth differential between the shallow and deep levels is bridged by a descending-ascending shoulder without any intervening barrier flight. During operation, the level differential induces a continuous tumbling and mixing action upon the molten resin in the mixing section.

15 Claims, 2 Drawing Sheets

EXTRUDER INJECTION APPARATUS AND METHOD

This invention relates to extruders and injection machines of the type in which a screw rotatable within a barrel is employed to extrude or inject resinous material from the outlet end of the barrel.

A plasticating extruder receives polymer pellets or powder, heats and works the polymer sufficiently to convert it to a melted or plastic state and delivers the melted polymer under pressure through a restricted outlet or die. It is desirable that the extrudate be fully melted homogeneously mixed and uniform in temperature and viscosity.

The basic extruder apparatus includes an elongated cylindrical barrel which may be heated at various locations along its length and a screw which extends longitudinally through the barrel. The screw has a core with a helical flight thereon and the flight cooperates with the cylindrical inner surface of the barrel to define a helical valley for passage of the resin to the extruder outlet opening or injection front chamber. Although the pitch of the flight can vary, it is common to utilize screws of constant pitch. The pitch is the forward distance traversed in one full revolution of the flight. The screw is rotated about its own axis to work the plastic material and force it toward the outlet end of the barrel.

An extruder screw ordinarily has a plurality of sections along its axial extent with each section being suited to the attainment of a particular function. Ordinarily, there is a feed section, a transition section and a metering section, in series. In some extruders, these sections are followed by a vent section plus a second transition section and a second metering section. The extruder screw feed section extends beneath and forwardly from a feed opening where polymer in pellet or powder form is introduced into the extruder to be carried forward along the inside of the barrel. The depth of the helical valley of the screw in the feed section is usually large enough to over-feed the solid polymer. The over-feeding action serves to compact and pressurize the polymer particles and form a solid bed of advancing material in the extruder.

The material is worked and heated so that melting of the polymer occurs as the material is moved along the screw. Solids conveying and compaction occur in the feed section. Most of the melting occurs in the transition section. Most of the melting occurs near the barrel surface at the interface between a thin melt film and the solid bed of polymer. This general pattern persists until a substantial portion of the polymer reaches the molten state. After some 40 to 80 percent of the polymer has been melted, which usually occurs in the transition section, solid bed breakup usually occurs, and at this time particles of solid polymer become dispersed in the polymer melt. From this point on, it often is advantageous to intimately mix the polymer melt with the unmelted material to accelerate melting and minimize local non-uniformities.

The melt is passed through the transition section to reduce the root depth of the helical passageway to reflect the volume reduction due to melting of the feed. The reduction of depth in the transition section also compresses the solid. The transition section leads to a metering section, which has a shallow root depth helical passageway. Generally, the metering section begins when the resin is at least 90 percent melted. The metering section has as its function the exertion of a constant flow rate pumping action on the molten polymer. In addition, any unmelted solids are melted in the metering section.

As stated, the root depth in the metering section is shallow. This increases shear and friction in the polymer. These factors have a tendency to raise the temperature of the polymer. The temperature rise may induce thermal degradation of the polymer. Further, increases in shear rate and temperature usually have marked effects upon viscosity. A change in viscosity of the material being extruded in turn affects the flow rate of the material through the restricted outlet of the extruder or to the injection machine, so that there is failure to achieve the desired uniformity in output rate, which is significant for extruder operation.

An increase in passageway depth has an opposite effect upon the temperature of the material. In addition, an increase in passageway depth provides reduced mixing and reduced uniformity in the resin.

The present invention is directed to an apparatus and method for improved mixing and solids melting in the metering section and for reducing the described difficulties in the metering section. In accordance with this invention, the metering section employs a single helical flight extending through the metering section, with a helical valley defined by said flight for the passage of molten resin. The bottom surface for the valley in the metering section is divided into side by side relatively shallow and relatively deep levels so that said levels have a depth differential therebetween. The relatively deep level can be considered to be a channel extending along the relatively shallow level. The relatively shallow and relatively deep levels extend along the bottom surface of the valley in side by side helical paths.

It is an important feature of this invention that the side by side helical paths have a different pitch than the pitch of the helical flight so that the helical flight periodically interrupts the helical paths. The depth of the shallow level and the depth of the deep level each remains substantially uniform in the metering section. The depth differential between the shallow and deep levels is bridged by a descending-ascending shoulder without any intervening barrier flight. The descending-ascending shoulder should be substantially vertical or can be somewhat inclined.

In general, the pitch of the side by side helical paths should be at least 25 percent greater or less than the pitch of the helical flight. It is perferable that the pitch of the side by side helical paths be greater than the pitch of the helical flight. If the side by side helical paths have a greater pitch, the extent of resin mixing is greater and the vertical shoulder between the flights provides some assistance to the flight in pumping resin. However, the pitch of the side by side helical flights must be low enough to maintain the basic characteristics of the metering section, such as uniform cross-sectional area along the flow path and a constant pumping flow rate. If the pitch of the side by side helical paths becomes too great, the helical paths would assume the characteristics of paths perpendicular to the helical flights and the vertical shoulder between the paths would tend to periodically dam the flow path. If this were to occur, the flow steam would be essentially traversing high and low root levels in series, resulting in flow restrictions.

The pitch of the helical flight and of the helical paths on the root can each remain substantially constant. However, because the pitch of the flight is different from the pitch of the helical paths, the flight interrupts the forward flow of fluid occurring along the helical paths, i.e. the forward flow impinging on the sides of the flight tends to be deflected by the flight. Thereby, a tumbling flow effect tends to be achieved with the present invention which induces mixing, resulting in turbulence instead of laminar flow and the avoidance of temperature and viscosity gradients.

In terms of method, the present invention relates to the plasticating of resinous material in a molten state under pressure by feeding resinous material in a solid state to a screw extruder having a helical flight and rotated in a barrel having a cylindrical inner surface with the flight with the inner surface cooperating to move the material along a helical path. Heat is applied to the barrel and to the material while working the material between the barrel and the screw to convert the material to a molten state with a minor amount of unmelted particles. The flow of material in a molten state is passed through a shallower metering section having a helical valley defined by the helical flight.

The bottom surface of the valley in the metering section is defined by relatively shallow and relatively deep levels extending in side by side helical paths having a depth differential therebetween. The deep level constitutes a channel extending along the shallow level. The helical paths have the same pitch as each other but have a different pitch than the pitch of the helical flight and the depth of the helical paths is substantially uniform in the metering section. The depth differential between the helical paths is bridged by an ascending-descending shoulder without any intervening barrier flight. The material in the molten state continuously and unobstructively passes in tumble mixing flow between said relatively shallow and deep levels during passage of material through the metering section.

The tumble mixing flow between the relatively shallow and deep levels during passage through the metering section provides turbulence and a massaging effect on the fluid resin. This effect provides many advantages. It tends to mix hot liquid and cooler solid material to help accomplish melting of all resinous material in the metering section. It accomplishes a high degree of mixing of all components in the system, such as different resins and color bodies. It reduces excessive shearing forces on the molten resin. It tends to avoid temperature and viscosity differentials in the flowing resin.

These advantages will be more readily apparent by reference to the attached drawings in which.

Figure 2:
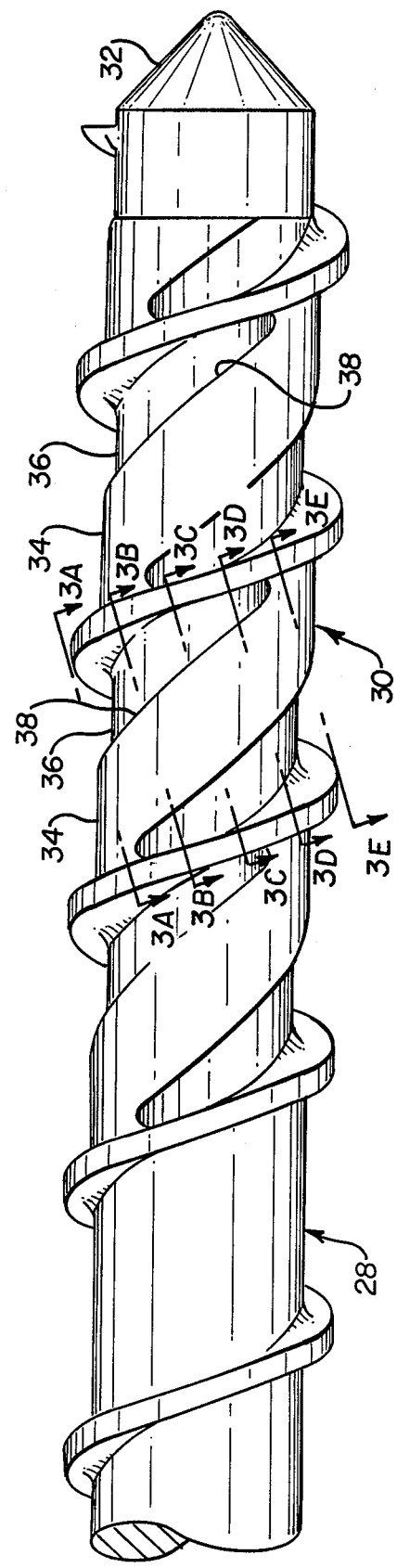
FIG. 2 shows a blown-up view of the metering section of the screw of FIG. 1.
Figure 3A:
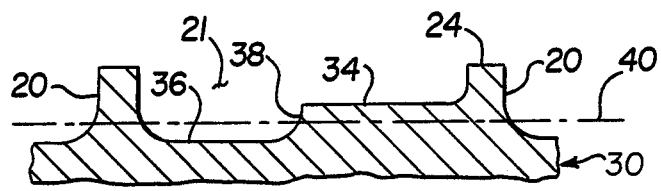
Figure 3B:
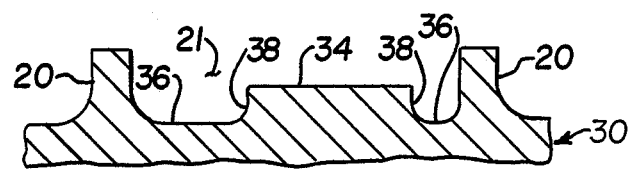
Figure 3C:
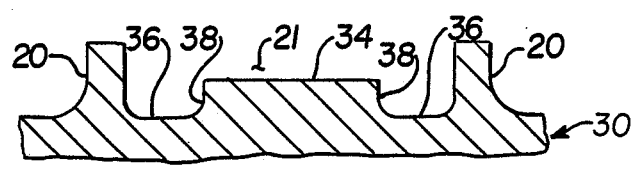
Figure 3D:
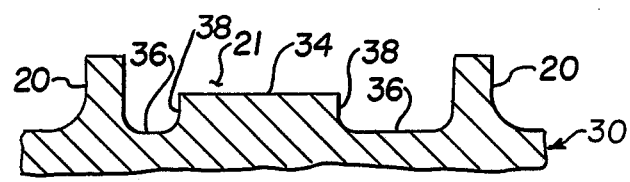
Figure 3E:
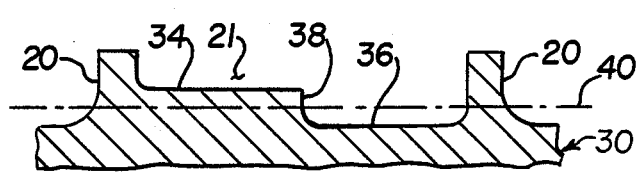
Figure 4:
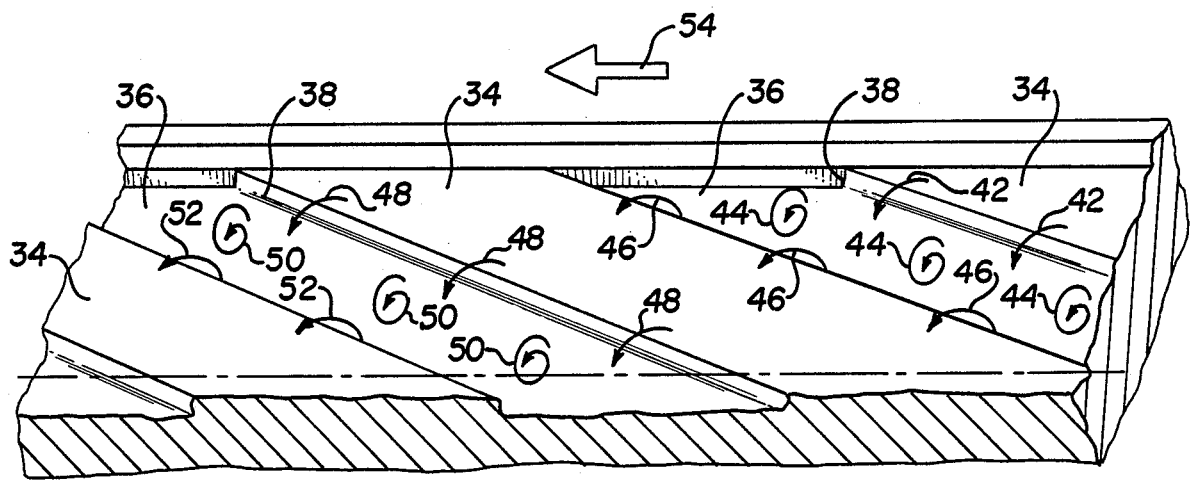

FIGS. 3A, 3B, 3C, 3D and 3E present five consecutive cross-sectional views taken through the metering section of FIG. 2, and FIG. 4 illustrates the tumbling and mixing action occurring in the metering section.

Figure 1:
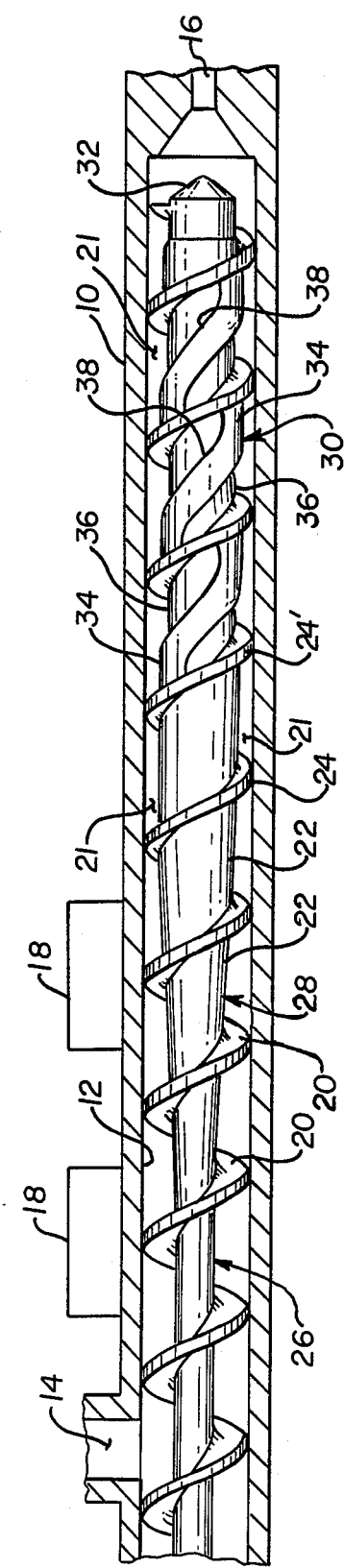
FIG. 1 shows an extruder screw plasticating apparatus.

FIG. 1 shows an extruder screw plasticating apparatus including a cylindrical barrel 10 having a cylindrical inner surface 12. Barrel 10 is provided with inlet port 14 for the admission of one or more solid particulate resinous materials and any required additives or agents and discharge port 16 for the discharge of plasticated molten extrudate. Any conventional heating means 18 can be provided on the outside of barrel 10 for applying heat to barrel 10.

Within barrel 10 is a screw which is rotatable by means not shown. The screw includes single continuous helical flight 20 winding around core 22. Flight 20 includes flight land 24 which moves in close cooperative association with respect to inner surface 12 of barrel 10. The axial distance between comparable points on adjacent flights, as shown at 24—24', represents the pitch of the flight.

Flight 20 defines a helical valley 21 bounded by flight 20, inner surface 12 of barrel 10 and the surface of core 22. The surface of the valley on core 22 is the root of the valley. The screw includes a relatively deep root feed section 26 for the admission, heating and working of solid feed resin, a transition section 28 of reducing root depth to adapt to the reduced volume of resin due to elimination of air spaces between the solid particles, and a relatively shallow root metering or pumping section 30 wherein the resin is predominantly in the molten state with only a minor amount of solid particles remaining or no solid particles. A discharge cone or valve 32 is employed.

The bottom surface or root of helical valley 21 in metering section 30 includes a relatively shallow level 34 and a relatively deep level 36. Levels 34 and 36 each constitute helical pathways in valley 21. Deep level 36 constitues a helical channel extending alongside shallow level 34. The breadth of shallow and deep levels 34 and 36 are preferably about equal, but one level can have up to two or three times the breadth of the other level. Shallow level 34 and channel 36 each is flat and has a substantially uniform depth along metering section 30. Shallow level 34 and channel 36 extend in side by side or adjacent helical paths having the same pitch as each other but a different pitch than the pitch of helical flight 20. The pitch of the helical paths can be smaller or larger than the pitch of helical flight 20, but is preferably larger, as shown. For example, the pitch of the helical paths can be between about 1.25 and 3 times the pitch of helical flight 20. Also, the pitch of the helical paths can be between about 0.3 and 0.8 times the pitch of helical flight 20. Because the helical paths have a different pitch than the pitch of flight 20, the helical paths and flight 20 cross each other. Thereby, flight 20 periodically interrupts the helical paths. The depth differential between shallow level 34 and deep level 36 is bridged by a descending or ascending shoulder 38 without any intervening barrier flight or obstruction so that there is unimpeded flow between the two levels. The depth of deep level 36 can be between about 1.5 and 3 times the depth of shallow level 34, measured from inner cylindrical surface 12, although depths below and above this ratio are acceptable.

FIG. 2 presents a blown-up view of metering section 30. FIG. 2 indicates five cross-sections 3A—3A, 3B—3-B—3C—3C, 3D—3D and 3A—3A, taken along the direction of resin flow. The views represented by these cross-sections are presented in FIG. 3.

The five cross-sectional views shown in FIG. 3 illustrate the changing configuration of the bottom surface of valley 21 experienced by molten resin as it flows through metering section 30. In section 3A—3A the entire right hand root level of valley 21 comprises shallow level 34 and the entire left hand root level of valley 21 comprises deep level or channel 36. The breadth of levels 34 and 36 are about equal. Line 40, which is about midway along the depth of shoulder 38, which connects the two levels, represents the normal or average metering depth of valley 21.

Section 3B—3B shows that as the molten resin advances along valley 21 it experiences a changed root configuration. Shallow level 34 has migrated leftward and a portion of channel 36 on its left disappears but reappears on its right. This progression continues in section 3C—3C to the extent that about one-half of channel 36 to the left of shallow level 34 has disappeared but has reappeared to the right of shallow level 34. In section 3D—3D most of channel 36 has disappeared on the left of shallow level 34 and has reappeared to the right of shallow level 34. Finally, in section 3E—3E, channel 36 has disappeared entirely on the left of shallow level 34 and has reappeared in its entirety on the right of shallow level 34. Line 40 indicates no change in the normal metering depth during this progression. It is noted that the volume available for resin in each of the cross-sections 3A—3A through 3E—3E is essentially uniform. Additional sections along the flow path, not shown, would show the continuation of the progression indicated in FIG. 3.

FIG. 4 is a computer assisted design diagram indicating the effect upon the molten resin caused by the progressive changes in root level depicted in FIG. 3. The diagram is based upon the facts that the pitch of side by side helical paths 34 and 36 is greater than the pitch of flight 20 and the depths of levels 34 and 36 are substantially constant throughout metering section 30 so that the total area of valley 21 is relatively constant along any cross-section of valley 21. Therefore, the progressive changes in root level shown in FIG. 3 cause the molten resin to experience a massaging effect as it flows along valley 21. The massaging effect occurs because a fixed volume of resin is accommodating itself to a fixed volume container of continuously changing configuration. During this accommodation, the molten resin is progressively forced to descend and ascend shoulder 38, as shown in FIG. 4. FIG. 4 shows that molten resin on shallow level 34 is forced to descend or tumble down shoulder 38 to channel 36, as shown by arrows 42. The molten resin in channel 36 experiences turbulence, as indicated by arrows 44. Further flow through valley 21 forces the molten resin to ascend shallow level 34, as shown by arrows 46. Later, the molten level on shallow level 34 descends or tumbles down shoulder 38, as indicated by arrows 48. The process continuously repeats itself, as shown by arrows 50 and 52, until the resin exits the metering section. The arrow 54 indicates the direction of flow imparted by helical flight 20 to the flowing resin so that FIG. 4 shows that the tumbling effect imparted by the side by side helical paths is continuously in the direction of the flow path imparted by flight 20.

The tumbling, turbulence and massaging effect on the fluid resin illustrated in FIG. 4 provides many advantages, as indicated above. First, it tends to mix hot liquid and cooler solid material by imparting turbulence to a laminar flow stream to help accomplish melting of all resinous material in metering section 30. Secondly, it accomplishes a high degree of mixing of all components in the system, such as different resins and color bodies to provide a homogeneous product of uniform color. Thirdly, it prevents a prolonged higher shear of molten resin on shallow level 34 to the heated inner cylindrical surface 12 of barrel 10, where thermal degradation could occur. Fourthly, it reduces shearing forces on the molten resin, thereby further tending to avoid overheating. Fifthly, it tends to avoid temperature and velocity gradients in the flowing resin stream. Sixthly, it guarantees that all resin must transit through a series of higher and lower levels in zones of essentially uniform cross-sectional area.

I claim:

1. A plasticating apparatus including a rotating screw having a helical flight disposed within and cooperating with the inner wall of a heated barrel provided with inlet and outlet openings and wherein particles of resinous material are introduced through said inlet opening to a helical valley extending along said flight to be plasticated by said screw and advanced towards said outlet opening, said screw having a metering section for working said resinous material at high temperature, the bottom surface of said helical valley in said metering section being divided into side by side relatively shallow and relatively deep levels having a depth differential therebetween, said relatively shallow and relatively deep levels extending along the bottom surface of said valley in side by side helical paths, said side by side helical paths having a different pitch than the pitch of said helical flight, the depth of said shallow level remaining substantially uniform in said metering section valley, the depth of said deep level also remaining substantially uniform in said metering section, and said depth differential between said shallow and deep levels being connected by a descending-ascending shoulder without any intervening barrier flight.

2. A plasticating apparatus including a rotating screw having a helical flight disposed within and cooperating with the inner wall of a heated barrel provided with inlet and outlet openings and wherein particles of resinous material are introduced through said inlet opening to a helical valley extending along said flight to be plasticated by said screw and advanced towards said outlet opening, said screw having a metering section for working said resinous material at high temperatures, the bottom surface of said helical valley in said metering section having a channel relatively deeper than said valley so that there is a depth differential between the bottom surface of said channel and said bottom surface of said valley, said channel extending in a helical path through said valley bottom surface, said helical path having a different pitch than the pitch of said helical flight so that the helical flight periodically interrupts said channel, the depth of said channel and the depth of said bottom surface of said valley each remaining substantially uniform in said metering section, and said depth differential being connected by a descending-ascending shoulder without any intervening barrier flight.

3. The plasticating apparatus of claim 2 wherein said screw has a feed section and a transition section in advance of said metering section.

4. The plasticating apparatus of claim 2 wherein the pitch of said helical path is between about 1.25 and 3 times the pitch of said helical flight.

5. The plasticating apparatus of claim 2 wherein the pitch of said helical path is between about 0.3 and 0.8 times the pitch of said helical flight.

6. The plasticating apparatus of claim 2 wherein the depth of said channel is between 1.5 and 3 times the depth of said bottom surface of said valley.

7. A plasticating apparatus including a rotating screw having a helical flight disposed within and cooperating with the inner wall of a heated barrel provided with inlet and outlet openings and wherein particles of resinous material are introduced through said inlet opening to a helical valley extending along said flight to be plasticated by said screw and advanced towards said outlet opening, said screw having a metering section for working said resinous material at high temperature and imparting a constant flow rate, the bottom surface of said helical valley in said metering section being divided into side by side relatively shallow and relatively deep levels having a depth differential therebetween, said relatively shallow and relatively deep levels extending along the bottom surface of said valley in side by side helical paths, said side by side helical paths having a greater pitch than the pitch of said helical flight so that said helical flight interrupts said side by side helical paths, and said depth differential between said shallow and deep levels being connected by a descending-ascending shoulder without any intervening barrier flight.

8. The plasticating apparatus of claim 7 wherein the depth of said shallow level remains substantially uniform in said metering section valley and the depth of said deep level also remains substantially uniform in said metering section valley.

9. The plasticating apparatus of claim 7 wherein the pitch of said side by side helical paths is at least 25 percent greater than the pitch of said helical flight.

10. A process for plasticating resinous material in a molten state under pressure comprising:
feeding resinous material in a solid state to a screw having a helical flight and rotated in a barrel having a cylindrical inner surface with said flight cooperating with said inner surface to move said material along a helical path,
applying heat to said barrel and said material while working the material between the barrel and the screw to convert it to a molten state with a minor amount of unmelted particles,
passing said material in the molten state at substantially constant flow rate through a metering section having a helical valley defined by said helical flight,
the bottom surface of said helical valley defined by relatively shallow and relatively deep levels extending in side by side helical paths having a depth differential therebetween, said helical paths having a different pitch than the pitch of said helical flight, and said depth differential being connected by an ascending-descending shoulder without any intervening barrier flight,
said material in the molten state continuously and unobstructively passing in tumble mixing flow between said relatively shallow and deep levels during passage through said metering section.

11. A process for plasticating resinous material in a molten state comprising:
feeding resinous material in a solid state to a screw having a helical flight and rotated in a barrel having a cylindrical inner surface with said flight cooperating with said inner surface to move said material along a helical path,
applying heat to said barrel and said material while working the material between the barrel and the screw to convert it to a molten state with only a minor amount of unmelted particles,
passing said material in the molten state at substantially a constant flow rate through a metering section having a helical valley defined by said helical flight,
the bottom surface of said helical valley having a channel extending in a helical path with a depth differential between the bottom surface of the channel and the bottom surface of the valley, said channel helical path having a different pitch than the pitch of said helical flight and said depth differential being connected by an ascending-descending shoulder without an intervening barrier flight,
said material in the molten state passing in tumble mixing flow between the bottom surface of said valley and the bottom surface of said channel during passage through said metering section.

12. The process of claim 10 with the depth of said shallow and deep levels each being substantially constant in said metering section.

13. The process of claim 11 with the depth of the bottom surface of the valley and the depth of the bottom surface of said channel each being substantially constant in said metering section.

14. The process of claim 10 wherein the pitch of said side by side helical paths is greater than the pitch of said helical flight 15. The process of claim 11 wherein the pitch of said channel is greater than the pitch of said helical flight.

* * * * *

UNITED STATES PATENT AND TRADEMARK OFFICE
CERTIFICATE OF CORRECTION

PATENT NO. : 4,752,136
DATED : June 21, 1988
INVENTOR(S) : PAUL N. COLBY

It is certified that error appears in the above-identified patent and that said Letters Patent is hereby corrected as shown below:

Column 3, line 1, change "interrups" to --interrupts--.

Column 4, line 55, change"3A-3A" to --3E-3E--.

Column 8, line 43, after "flight" insert --.--.

Signed and Sealed this

First Day of November, 1988

*Attest:*

DONALD J. QUIGG

*Attesting Officer*   *Commissioner of Patents and Trademarks*